US010171456B2

(12) United States Patent
Song

(10) Patent No.: US 10,171,456 B2
(45) Date of Patent: Jan. 1, 2019

(54) WIRELESS AUTHENTICATION SYSTEM AND WIRELESS AUTHENTICATION METHOD FOR ONE TIME PASSWORD OF MOBILE COMMUNICATION TERMINAL HAVING NEAR FIELD COMMUNICATION FUNCTION

(71) Applicant: SCTECHONE CO., LTD., Seoul (KR)

(72) Inventor: Sang-Hern Song, Gyeonggi-do (KR)

(73) Assignee: SCTECHONE CO, LTD., Seoul (KR)

( * ) Notice: Subject to any disclaimer, the term of this patent is extended or adjusted under 35 U.S.C. 154(b) by 281 days.

(21) Appl. No.: 14/917,470

(22) PCT Filed: Jul. 17, 2014

(86) PCT No.: PCT/KR2014/006503
§ 371 (c)(1),
(2) Date: Mar. 8, 2016

(87) PCT Pub. No.: WO2015/041401
PCT Pub. Date: Mar. 26, 2015

(65) Prior Publication Data
US 2016/0226862 A1    Aug. 4, 2016

(30) Foreign Application Priority Data

Sep. 17, 2013   (KR) .................. 10-2013-0111513

(51) Int. Cl.
*H04L 29/06*   (2006.01)
*H04W 4/80*    (2018.01)
*H04W 12/06*   (2009.01)
*H04L 9/32*    (2006.01)
*G06F 21/31*   (2013.01)

(52) U.S. Cl.
CPC ........ *H04L 63/0838* (2013.01); *H04L 9/3228* (2013.01); *H04W 4/80* (2018.02); *H04W 12/06* (2013.01); *H04L 63/0853* (2013.01)

(58) Field of Classification Search
CPC ...................................................... G06F 21/31
See application file for complete search history.

(56) References Cited

U.S. PATENT DOCUMENTS

| 8,230,231 | B2 * | 7/2012 | Freeman | .................. G06F 21/31 |
| | | | | 380/44 |
| 9,780,950 | B1 * | 10/2017 | Dundas | ............... H04L 63/0838 |
| 2007/0005955 | A1 * | 1/2007 | Pyle | ...................... H04L 9/3228 |
| | | | | 713/156 |
| 2007/0011724 | A1 * | 1/2007 | Gonzalez | ............... G06F 21/31 |
| | | | | 726/4 |

(Continued)

FOREIGN PATENT DOCUMENTS

| JP | 2011215940 | 10/2011 |
| KR | 20090096258 | 9/2009 |
| KR | 20120085790 | 8/2012 |

*Primary Examiner* — Josnel Jeudy
(74) *Attorney, Agent, or Firm* — IPLA P.A.; James E. Bame

(57) ABSTRACT

Provided is a one time password (OTP) authentication system and an OTP authentication method using a mobile communication terminal having a near field communication (NFC) function, wherein OTP authentication is capable of being carried out by using a mobile communication terminal having an NFC function and an OTP generator provided with a communication function corresponding to NFC.

16 Claims, 10 Drawing Sheets

(56) References Cited

U.S. PATENT DOCUMENTS

| | | | |
|---|---|---|---|
| 2010/0017860 A1* | 1/2010 | Ishida | G06F 21/31 |
| | | | 726/7 |
| 2011/0283340 A1* | 11/2011 | Ganesan | G06F 21/36 |
| | | | 726/4 |
| 2014/0263624 A1* | 9/2014 | Guillaud | G06K 5/00 |
| | | | 235/380 |
| 2015/0132984 A1* | 5/2015 | Kim | H04L 63/0838 |
| | | | 439/345 |

* cited by examiner

WIRELESS AUTHENTICATION SYSTEM AND WIRELESS AUTHENTICATION METHOD FOR ONE TIME PASSWORD OF MOBILE COMMUNICATION TERMINAL HAVING NEAR FIELD COMMUNICATION FUNCTION

BACKGROUND

The present invention generally relates to a one-time password (OTP) authentication system and method, and more particularly, to an OTP wireless authentication system and method using a mobile communication terminal having a near field communication (NFC) function which are capable of performing OTP authentication using a mobile communication terminal having an NFC function and an OTP generator including a communication function corresponding to the NFC.

The popularization of the Internet, resulting from increased internet speed, has introduced various kinds of online business transactions (such online business transactions are typically referred to as "electronic commerce") and membership systems for providing and sharing various kinds of information are being generalized. For electronic commerce and membership registration, various kinds of private information are required to be registered on an internet server that provides some service. In order to protect such private information, each service server sets an ID and password unique to a user and allows user information to be checked, amended, and changed only when an input ID and password are identical to a pre-stored ID and password.

Since an ID and fixed password authentication scheme has a limitation in that IDs and passwords are easily exposed, however, it is difficult to protect private information stored in internet servers using only IDs and passwords. In order to improve on such an existing authentication method, an authentication certificate, a one-time password (OTP) scheme, etc., are being applied in combination.

However, the authentication certificate scheme has a limitation in that once an authentication certificate and a password thereof are exposed, a user may directly suffer monetary damage.

In order to respond to the deficiencies of the ID/password scheme and the authentication certificate scheme, recently introduced is an OTP authentication scheme, in which an OTP is generated using an OTP generator (e.g. a token type or card type, etc.) separately carried by a user, and authentication is performed using the OTP, without a high security password for user authentication or payment message authentication remembered by the user or stored in a service terminal.

FIG. 1 illustrates the configuration of a typical dedicated card-type OTP generator, and FIG. 2 illustrates the configuration of a card-type OTP generator combined with a financial card.

Typically, the dedicated card-type OTP generator 1 includes an OTP generation unit 20 contained in a card 10.

The OTP generator 20 includes a button 21 for generating an OTP generation request signal 21, a micro control unit (MCU) 22 for generating an OTP when the OTP generation request signal is input, a display unit 23 for displaying the generated OTP, and a battery 24 for supplying driving power to the button 21, the MCU 22, and the display unit 23. A method for generating the OTP is disclosed in an HMAC-Based OTP Algorithm (RFC4226), a Time-based OTP (TOPT) Algorithm (RFC6238), and an OATH Challenge/Response Algorithms (OCRA) Specification (RFC6287), and accordingly a description thereof will be omitted.

The financial card combined-type OTP generator 1 includes an OTP generating unit 20, for generating and displaying an OTP, and a financial processing unit 30, for storing typical financial card information and performing a financial process such as provision of the financial card information in response to reception of a wireless signal. The financial processing unit 30 includes an antenna 32 for receiving a wireless signal transmitted from a near field communication (NFC) module of a mobile communication terminal, such as a smartphone, or a wireless signal for requesting the financial card information from a typical card reader and wirelessly transmitting a response signal including the financial card information corresponding to the received wireless signal, and a financial process control unit 31 for transmitting pre-stored financial card information through the antenna 32 when the wireless signal is received through the antenna 32. The financial processing control unit 31 is configured with a chip on board (COB).

The OTP generating unit 20 and the financial processing unit 30 are respectively configured to operate separately, as illustrated in FIG. 2.

As the foregoing, various types of OTP generators are developed and used for services such as high-value transactions or transfers, etc., around the financial world, but the generated OTP is required to be input within a certain time, which causes user inconvenience.

In addition, since it is available to anyone merely by pressing a button, a typical OTP generator may be illegally used by a third party when lost.

In addition, a typical OTP generator has a usage limitation in that a user may not use it when a fault occurs, even only in a part thereof. Since such an OTP is frequently used in financial transactions, the occurrence of usage limitations attributable to such faults may cause significant monetary loss to a user.

In addition, in an OTP authentication system using an existing OTP generator, when a user inputs an OTP into a web service site accessed through a user authentication terminal such as a computer, the OTP may be exposed by memory hacking.

SUMMARY OF THE INVENTION

Accordingly, the present invention has been made keeping in mind the above problems occurring in the prior art, and an object of the present invention is to provide a one-time password (OTP) wireless authentication system and method using a mobile communication terminal having a near field communication (NFC) function capable of OTP authentication using the mobile communication terminal having the NFC function and an OTP generator having a communication function corresponding to the NFC function.

Another object of the present invention is to provide an OTP wireless authentication system and method using a mobile communication terminal having an NFC function such that, when performing OTP wireless authentication, transaction information such as financial information is displayed on the mobile communication terminal to check whether hacking has occurred.

In order to accomplish the above objects, the present invention provides a one-time password (OTP) authentication system comprising an OTP authentication server, the OTP authentication system including: a web service server providing one of an OTP generator registration means and an OTP authentication means depending on whether an OTP generator is registered, when a user requests a web service requiring OTP authentication through a user authentication terminal, transmitting one of an OTP generator registration request signal, which comprises user identification information and identification information for a mobile communication terminal of the user, and an OTP authentication request signal, and providing the web service depending on an OTP verification result received in response thereto; a wireless OTP generator generating and displaying an OTP when an OTP generation event occurs, and wirelessly transmitting the OTP when an OTP request signal is received; a mobile communication terminal obtaining the OTP generated by the wireless OTP generator when an OTP request message is received, and transmitting OTP authentication information comprising the OTP and identification information of the mobile communication terminal; and a touch authentication server obtaining the OTP authentication information and registering the wireless OTP generator and the mobile communication terminal through the mobile communication terminal when the OTP generator registration request signal is received from the web service server, obtaining the OTP authentication information through a mobile communication terminal corresponding to the user identification information when an OTP authentication request signal for registered user identification information is received, verifying an OTP of the obtained OTP authentication information through the OTP authentication server, and providing an OTP verification result to the web service server.

The wireless OTP generator may include: an OTP processing unit, which generates, displays, and outputs the OTP; and a wireless processing unit, receiving and storing the OTP and wirelessly transmitting the stored OTP to the mobile communication terminal through an antenna when an OTP request signal is received from the mobile communication terminal through the antenna.

The OTP processing unit may include: a first display unit displaying the OTP; an input unit comprising at least one button, which comprises an OTP generation button, and outputting a button signal for a pressed button; a power supply unit supplying power to the OTP processing unit; and an OTP control unit receiving the power to operate the OTP processing unit, detecting the OTP generation event due to an input of the OTP button signal to generate the OTP, displaying the OTP on the first display unit, and outputting the OTP.

The OTP processing unit may include: the first display unit, displaying the OTP; an RF detection unit, detecting an RF signal received through the antenna; a power supply unit, supplying power to the OTP processing unit; and an OTP control unit, receiving the power to operate the OTP processing unit, sensing the OTP generation event by detecting the RF signal through the RF detection unit to generate the OTP, displaying the OTP on the first display unit, and outputting the OTP.

The OTP authentication system may further include a second display unit, which emits light under the control of the OTP control unit at the time of an OTP generation operation by the OTP control unit.

The wireless processing unit may include: a wireless card processing unit, performing operations according to a wireless card function; a wireless OTP processing unit, receiving and storing, in an activated state, an OTP output from the wireless processing unit and wirelessly transmitting the stored OTP to the mobile communication terminal through the antenna, upon receiving the OTP request signal through the antenna; and an OTP interlocking unit, activating the wireless card processing unit to perform the wireless card function by default, and receiving a wireless OTP processing unit driving request signal through communication with the OTP processing unit to activate the wireless OTP processing unit.

The wireless OTP processing unit may further include a sub-OTP generation unit generating an OTP and storing the OTP in the activated state, when an OTP generation command is received from the mobile communication terminal, wherein the mobile communication terminal obtains an OTP by transmitting the OTP generation command to the wireless OTP processing unit of the wireless OTP generator, when the OTP obtained from the wireless OTP generator is an initial value.

The web service server may transmit transaction information to the touch authentication server when a transaction event is generated by an arbitrary web service, and may determine whether to provide a corresponding web service according to whether the transaction information is approved, the touch authentication server may transmit, to the mobile communication terminal, the transaction information, upon receiving the transaction information due to the transaction event generated from the web service server, and may receive information about whether to approve the transaction information from the mobile communication terminal and provides the information about whether to approve the transaction to the web service server, the mobile communication terminal may display the transaction information to a user upon receiving the transaction information, may request driving of the wireless OTP processing unit of the wireless OTP generator upon receiving approval of the user, and may transmit the transaction information, the wireless OTP processing unit of the wireless OTP generator may store the transaction information upon receiving the transaction information, and the OTP processing unit may load the transaction information when there is transaction information stored in the wireless OTP processing unit at the time that the OTP generation event occurs, and may reflect the transaction information to generate the OTP.

The OTP in which the transaction information is reflected may be generated by any one selected from the following Equations 1 to 3:

Time-based OTP Algorithm (TOTP,RFC6238) scheme Transaction_OTP=HMAC (SeedKey, Time+transaction message)     [Equation 1]

HOTP (HMAC-Based OTP Algorithm (RFC4226)) scheme Transaction_OTP=HMAC (SeedKey, [Authentication Counter or time or challenge],+ transaction message)     [Equation 2]

OCRA (OATH Challenge/Response Algorithms Specification (RFC6287) scheme

Transaction_OTP=HMAC (SeedKey,client Random+ authentication Counter+server Random+Time+ transaction message).     [Equation 3]

The transaction information may be one of information about money, an account number and a card number.

In order to accomplish the above objects, the present invention provides an OTP authentication method of an OTP authentication system comprising an OTP authentication server, the OTP authentication method including: a wireless OTP registration process for receiving, by a touch authentication server, user identification information or mobile communication terminal identification information to register a wireless OTP generator of a user in the touch authentication server when the user requests a web service requiring OTP authentication through a web service server for providing the web service; an OTP request process for requesting, by the touch authentication server, an OTP from a mobile communication terminal, corresponding to mobile communication terminal identification information corresponding to user identification information of an arbitrary user, when the web service request is made to the web service server by the arbitrary user, after the wireless OTP registration; an OTP generation process for generating, by a wireless OTP generator, an OTP, when an OTP generation event occurs; an OTP obtaining process for obtaining, by the mobile communication terminal, the OTP generated in the OTP generation process and providing the OTP to the touch authentication server, when an OTP authentication request is received from the touch authentication server; and an OTP verifying process for verifying, by the touch authentication server, an OTP received from the mobile communication terminal through the OTP authentication server and providing a verification result to the web service server.

The OTP generation process may include: an OTP generation event monitoring step for checking, by the OTP processing unit, whether the OTP generation event occurs; an OTP generation step for generating, by the OTP processing unit, the OTP when the OTP generation event occurs; an OTP display step for displaying, by the OTP processing unit, the generated OTP on a first display unit; and a storage step for outputting, by the OTP processing unit, the displayed OTP to a wireless processing unit to store the OTP in the wireless processing unit.

The OTP generation event may occur when an OTP generation button of an input unit of a wireless OTP generator is pressed.

The OTP generation event may occur by detecting, by the OTP processing unit, an OTP request signal received from the mobile communication terminal through an RF detection unit connected to an antenna.

The OTP generation process may further include an operation informing step for flashing a second display unit formed of a light-emitting diode so as to indicate that the OTP processing unit is in operation at a time of generating and displaying the OTP.

The OTP obtaining process may include: an OTP reception monitoring step for monitoring whether the OTP authentication request signal is received from the touch authentication server; an OTP input monitoring step for monitoring whether the OTP is input from the input unit when the OTP authentication request signal is received; and an OTP providing step for providing the OTP to the touch authentication server when the OTP is input through the input unit.

The OTP obtaining process may include an OTP reception monitoring step for monitoring whether the OTP authentication request signal is received from the touch authentication server, an OTP obtaining step for driving a near-field communication (NFC) unit to wirelessly read an OTP stored in the wireless processing unit of the wireless OTP generator when the OTP authentication request signal is received, and an OTP providing step for providing the OTP to the touch authentication server when the OTP is obtained through the NFC unit.

The OTP obtaining process may further include a PIN authentication step for requesting input of a PIN from the user and receiving the PIN, and comparing a preset PIN with the input PIN to perform PIN authentication, when the OTP authentication request signal is received in the OTP reception monitoring step.

The OTP obtaining process may further include an OTP regeneration process for checking, by the mobile communication terminal, whether the obtained OTP is an initial value, and, if the obtained OTP is the initial value, transmitting an OTP generation command to the wireless OTP generator, and in response thereto, receiving a new OTP generated by the wireless OTP generating unit.

The OTP regeneration process may include: an OTP abnormality determination step for checking, by the mobile communication terminal, whether the obtained OTP is an initial value; a wireless OTP processing unit driving request step for determining that the OTP is abnormal when the OTP is the initial value and transmitting a wireless OTP processing unit driving command; a wireless OTP processing unit driving step for driving, by an OTP interlocking unit, the wireless OTP processing unit by the wireless OTP processing unit driving command; an OTP generation request step for transmitting, by the mobile communication terminal, the OTP generation command; an OTP providing step for driving, by the wireless OTP processing unit, a sub-OTP generation unit to generate the OTP and transmitting the OTP to the mobile communication terminal; and an OTP obtaining step for obtaining, by the mobile communication terminal, the OTP from the wireless OTP processing unit.

The OTP authentication method further includes: a transaction information transmitting process for transmitting, by the web service server, transaction information to the touch authentication server when the transaction information is generated in the OTP request process; a transaction information informing process for transmitting, by the touch authentication server, the transaction information to the mobile communication terminal upon receiving the transaction information in response to occurrence of a transaction event from the web service server; a transaction information approval determination process for displaying, by the mobile communication terminal, the transaction information to a user, upon receiving the transaction information, and prompting the user to approve the transaction information; a transaction approval process for transmitting, by the mobile communication terminal, the transaction information after a request for driving a wireless OTP processing unit of a wireless OTP generator when approval for the displayed transaction information is input; and an OTP storage process for storing, by the wireless OTP generator, the transaction information when the transaction information is received from the mobile communication terminal, wherein the transaction information is reflected to generate the OTP when stored transaction information exists at the time of occurrence of the OTP generation event in the OTP generation process.

The OTP in which the transaction information is reflected may be generated by any one selected from the following Equations 1 to 3;

Time-based OTP Algorithm (TOTP,RFC6238) scheme Transaction_OTP=HMAC (SeedKey, Time+transaction message)      [Equation 1]

HOTP (HMAC-Based OTP Algorithm (RFC4226)) scheme Transaction_OTP=HMAC (SeedKey, [Authentication Counter or time or challenge],+ transaction message)      [Equation 2]

OCRA (OATH Challenge/Response Algorithms Specification (RFC6287) scheme

Transaction_OTP=HMAC (SeedKey,client Random+ authentication Counter+server Random+Time+ transaction message).      [Equation 3]

According to the present invention, since an OTP generated by an OTP generator is not directly input by the user, but is readable wirelessly, it is possible to provide increased convenience to a user.

In addition, according to the present invention, security can be improved, since a user does not perform OTP authentication over the internet with a web service server, which requires a user to currently access and perform the OTP authentication, but transmits an OTP generated by an OTP generator to an OTP authentication server through a mobile communication network and a mobile communication terminal to thus perform OTP authentication. In other words, security can be improved by separating the path for requesting authentication from the path through which authentication is actually performed.

In addition, according to the present invention, since an OTP is transmitted through a mobile communication terminal, if the OTP generator is lost, there is no concern about illegal use by a third party.

According to the present invention, before an OTP is received, since a mobile communication terminal receives a personal identification number (PIN) to perform PIN authentication, even if both the OTP generator and the mobile communication terminal are lost, illegal use by a third party can still be prevented.

In addition, according to the present invention, since a financial processing unit and an OTP generating unit are configured together in an OTP generator and an OTP generated by the OTP generating unit is allowed to be stored in the financial processing unit, even when a display device and a button of the OTP generator are faulty, the OTP stored in the financial processing unit can be read and checked through a mobile communication terminal.

In addition, according to the present invention, since a financial processing unit and an OTP generating unit are configured together in an OTP generator, when the OTP generating unit is faulty, an OTP is still allowed to be generated through the financial processing unit. Therefore, even at the time of sudden occurrence of a fault in the OTP generating unit, the OTP is allowed to be used, and accordingly, users' monetary loss attributable to the sudden failure of the OTP generating unit can be prevented.

In addition, according to the present invention, in OTP authentication, transaction information, such as financial information input to a user authentication terminal such as a PC, can be displayed on a mobile communication terminal to check whether hacking has occurred, and the transaction information can be reflected to generate an OTP and prevent forgery of the transaction information.

DETAILED DESCRIPTION OF THE INVENTION

Hereinafter, the configuration and operation of a wireless authentication system for a one-time password (OTP) using a mobile communication terminal having a near field communication (NFC) function, and a wireless authentication method for OTP using a mobile communication terminal in the system will be described in detail with reference to the accompanying drawings.

Figure 1:
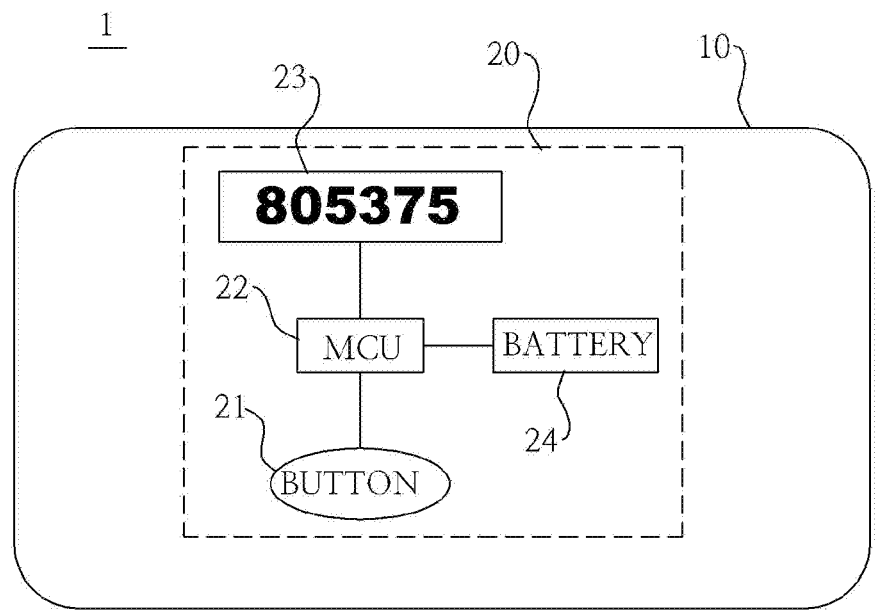
FIG. 1 illustrates the configuration of a typical dedicated card-type OTP generator.
Figure 2:
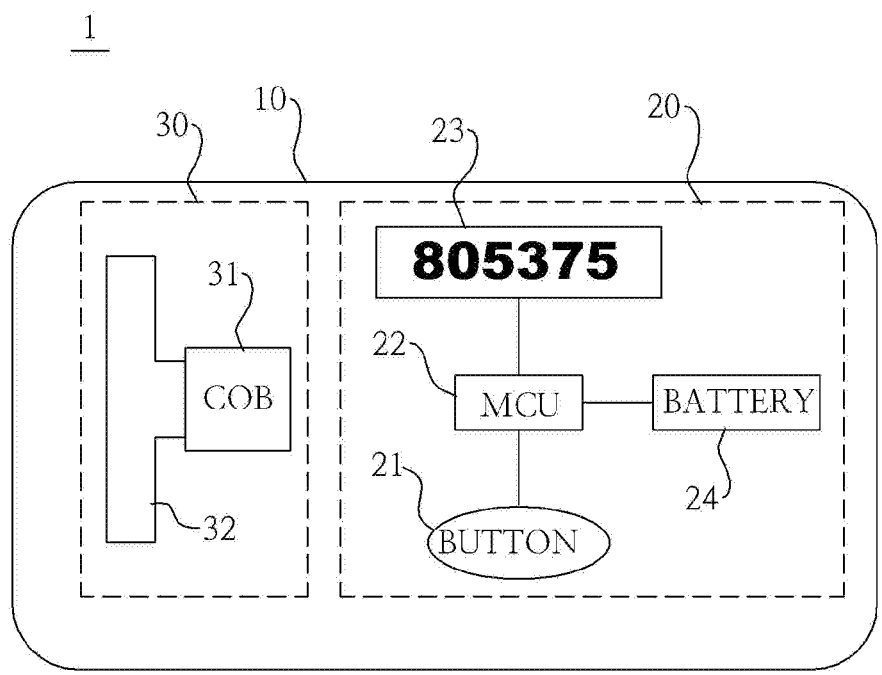
FIG. 2 illustrates the configuration of a typical financial card-combined OTP generator.
Figure 3:
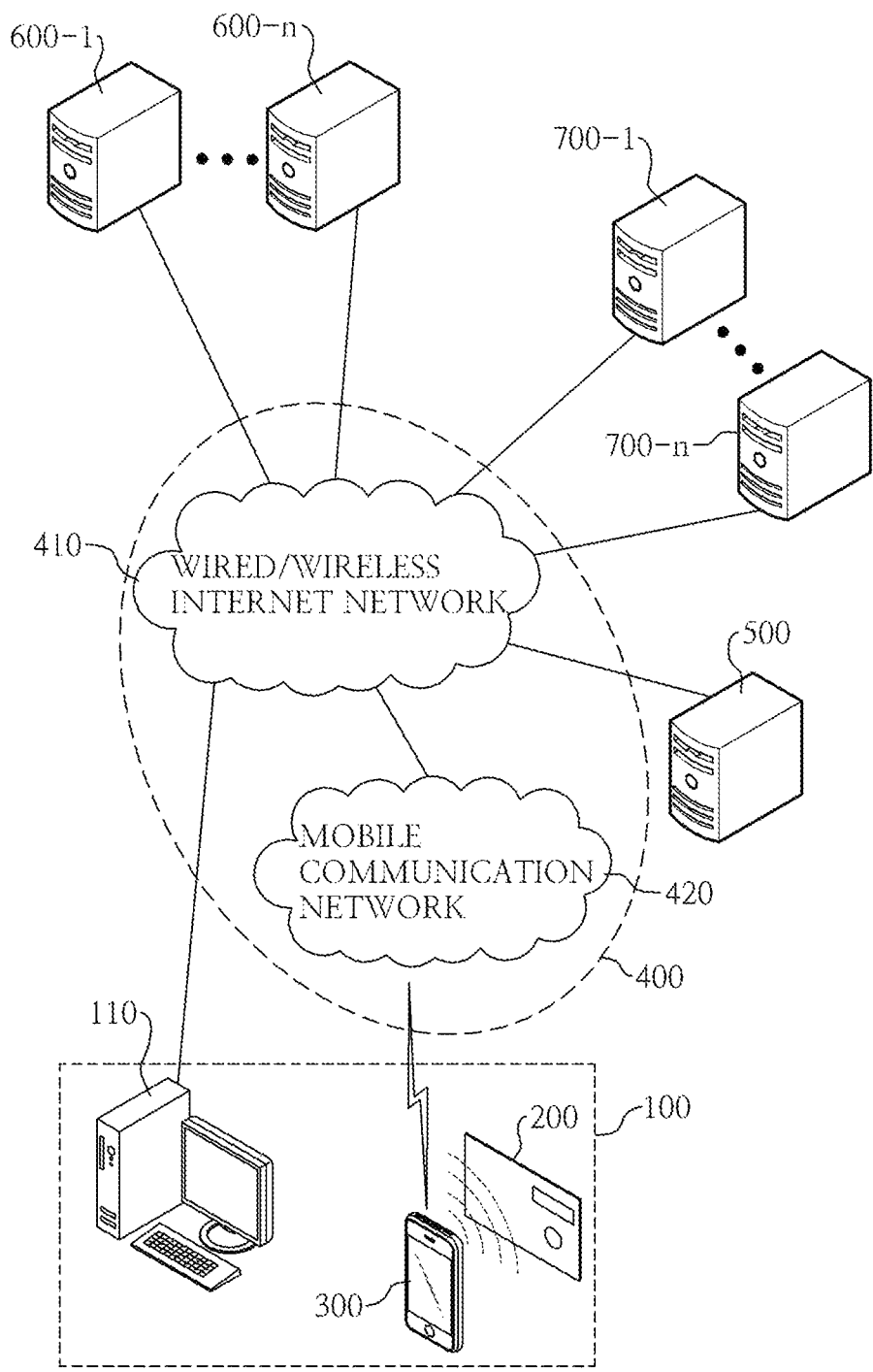
FIG. 3 illustrates the configuration of an OTP wireless authentication system using a mobile communication terminal having an NFC function according to an embodiment of the present invention.
Figure 4:
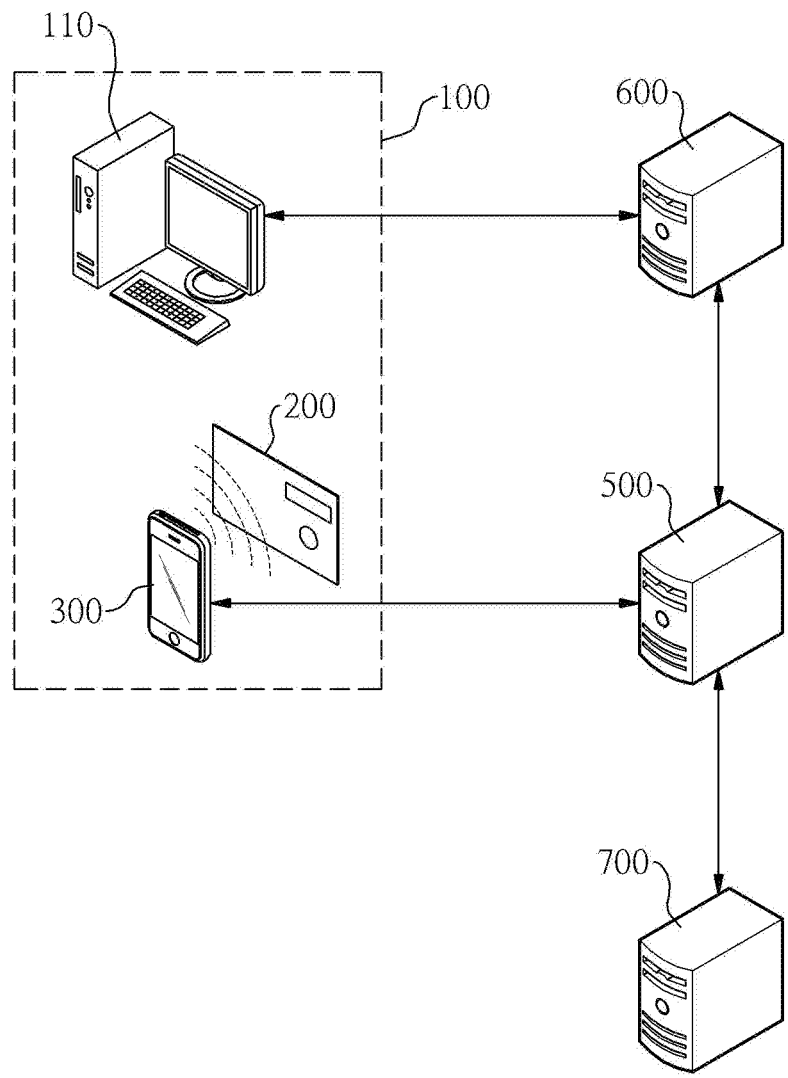
FIG. 4 illustrates the conceptual configuration of an OTP wireless authentication system using a mobile communication terminal according to an embodiment of the present invention.

FIG. 3 illustrates the configuration of a OTP wireless authentication system using a mobile communication terminal having an NFC function according to an embodiment of the present invention, and FIG. 4 illustrates the conceptual configuration of an OTP wireless authentication system using a mobile communication terminal according to an embodiment of the present invention.

Referring to FIGS. 3 and 4, an OTP wireless authentication system using a mobile communication terminal includes a user terminal unit 100, a touch authentication server 500, a web service server 600, and an OTP authentication server 700.

The user terminal unit 100 is connected to the touch authentication server 500, the web service server 600, and the OTP authentication server 70 through a wired/wireless communication network 400 to perform data communication. The user terminal unit 100 includes a user authentication terminal 110, a wireless OTP generator 200, and a mobile communication terminal.

The user authentication terminal 110 may be a personal computer (PC), a notebook, a smart TV, a kiosk, a smart pad, a smartphone, or the like, and may access the web service server 600 through the wired/wireless communication network 400 to generate an authentication event including a log-in for receiving an arbitrary web service, or an OTP authentication for using a web service such as making an account transfer or a payment, and receives a corresponding web service when authentication succeeds.

The wireless OTP generator 200 has unique seed information, generates a random OTP using the seed information, and selectively provides the generated OTP to the mobile communication terminal 300 in a wireless manner. The detailed configuration and operation of the wireless OTP generator 200 will be described in detail with reference to FIGS. 5 and 6, to be described later.

The mobile communication terminal 300 receives an OTP input request message from the touch authentication server 500 at the time of generation of the authentication event in the user authentication terminal 110, and directly receives the OTP generated by the wireless OTP generator 200 from a user or automatically receives the OTP in a wireless manner and provides the OTP to the touch authentication server 500.

The web service server 600 is a server for providing various web services such as payment and account transfer, which require login and authentication using an OTP. The web service server 600 according to the present invention transmits an OTP authentication request signal including unique identification information, such as the phone number of the mobile communication terminal 300, to the touch authentication server 500, when an authentication event occurs in the accessed user authentication terminal 110, receives a corresponding OTP authentication result, and provides service depending on the result.

The OTP authentication server 700 stores seed information for each piece of identification information for the wireless OTP generator 200. When receiving an OTP verifying request signal from the touch authentication server 500, the OTP authentication server performs verification with the received OTP and the seed of the wireless OTP generator 200 that generated the OTP, and provides the verification result to the touch authentication server 500.

As illustrated in FIG. 4, the touch authentication server 500 is connected between the mobile communication terminal 300 of the user terminal unit 100, the web service server 600, and the OTP authentication server 700 to perform an authentication process using the OTP according to the present invention. In detail, the touch authentication server 500 obtains an OTP through the mobile communication terminal 300 at the time of receiving an OTP authentication request from the web service server 600, verifies the obtained OTP through the OTP authentication server 700, and then provides the result thereof to the web service server 600.

Figure 5:
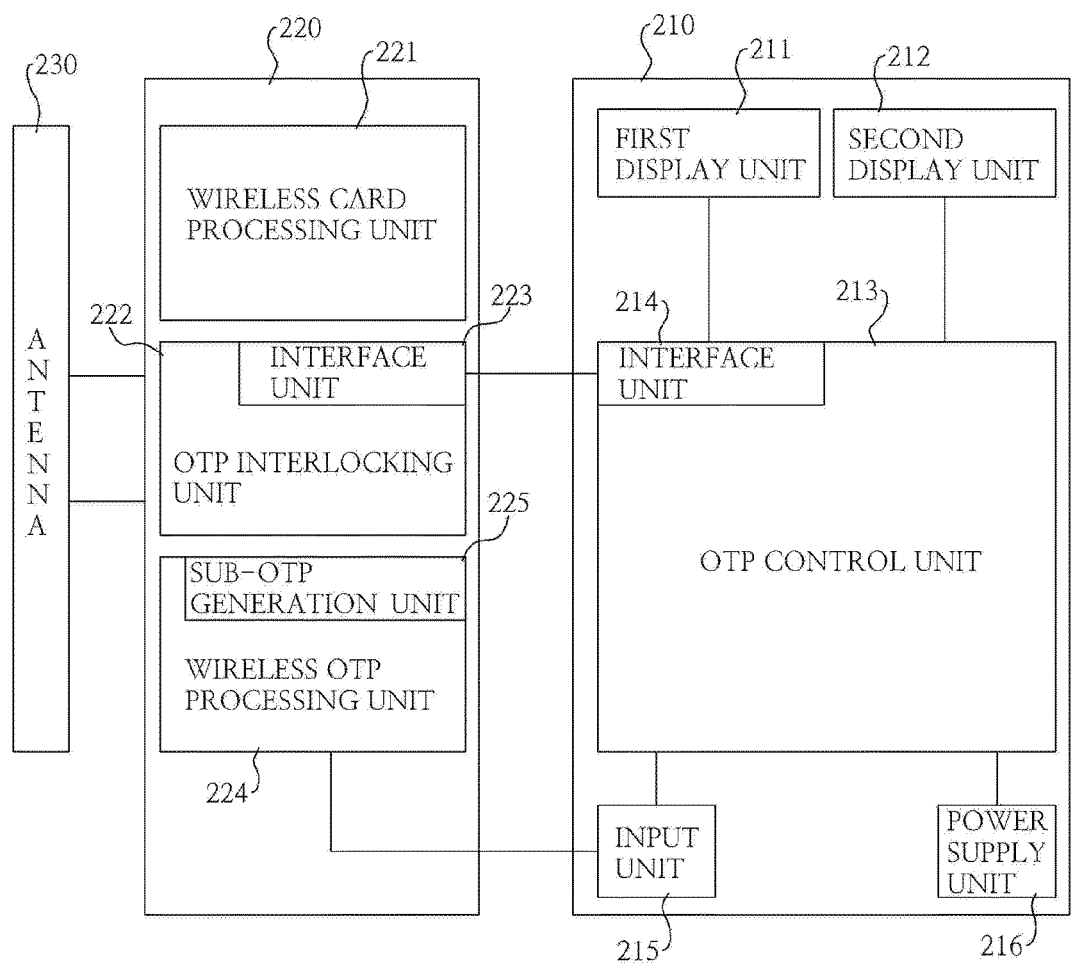
FIG. 5 illustrates the configuration of an OTP generator of an OTP wireless authentication system using a mobile communication terminal according to a first embodiment of the present invention.

FIG. 5 illustrates the configuration of an OTP generator of an OTP wireless authentication system using a mobile communication terminal according to a first embodiment of the present invention. Hereinafter, the configuration and operation of the wireless OTP generator according to the present invention will be described in detail with reference to FIG. 5.

The wireless OTP generator 200 according to the present invention includes an OTP processing unit 210 and a wireless processing unit 220.

The OTP processing unit 210 may include, according to a first embodiment, a first display unit 211, an OTP control unit 213, an input unit 215, and a power supply unit 216, and additionally may further include a second display unit 212.

The first display unit 211 displays, under the control of the OTP control unit 214, one of operation state information on the OTP processing unit 210, information corresponding to a button on the input unit 213 that was pressed, and an OTP, and may also further display transaction information according to a fifth embodiment of the present invention.

The second display unit 212 displays whether the wireless OTP generator 200 is operating normally, and may be configured with a light-emitting diode or the like.

The input unit 215 includes an OTP generation button for generating an OTP, buttons numbered 1 to 9, and a special button, and outputs a button signal for a pressed button to the OTP control unit 213.

When all of the first display unit 211, the second display unit 212, the OTP control unit 213, and the input unit 215 use the same power supply, the power supply unit 216 may be configured only with batteries. When a power supply having at least two voltages is used, the power supply unit 216 may include a battery for providing source power and a power conversion unit (not illustrated) for converting the source power into a desired voltage.

The OTP control unit 213 controls the overall operation of the OTP processing unit 210 according to the present invention. In detail, as illustrated in FIG. 5, when an OTP generation button signal is input from the input unit 215, the OTP control unit 213 generates an OTP, displays the OTP on the first display unit 211, and performs operations respectively corresponding to other button signals input through the input unit 215. In particular, the OTP control unit 213 includes an interface unit 214 for communicating with the wireless processing unit 220, transmits, to the wireless processing unit 220, a wireless OTP processing unit driving command for requesting activation of the wireless OTP processing unit 224 of the wireless processing unit 220 through the interface unit 214 such that the mobile communication terminal 300 reads out the OTP through the wireless processing unit 220, and then transmits the OTP to the wireless OTP processing unit 224 of the wireless processing unit 220.

In addition, the OTP control unit 213 generates an OTP by reflecting transaction information for each OTP generation method in any one selected from among the following Equations 1 to 3 according to a fourth embodiment of the present invention. The transaction information may be information about a transaction occurring in services received through the web service server 600.

Time-based OTP Algorithm (TOTP,RFC6238)
scheme Transaction_OTP=HMAC (SeedKey,
Time+transaction message)     [Equation 1]

HOTP (HMAC-Based OTP Algorithm (RFC4226))
scheme Transaction_OTP=HMAC (SeedKey,
[Authentication Counter or time or challenge],+
transaction message)     [Equation 2]

OCRA (OATH Challenge/Response Algorithms
Specification (RFC6287) scheme

Transaction_OTP=HMAC (SeedKey,client Random+
authentication Counter+server Random+Time+
transaction message)     [Equation 3]

The wireless processing unit 220 includes a wireless card processing unit 221, an OTP interlocking unit 222, and a wireless OTP processing unit 224.

The wireless card processing unit 221 receives an information request signal through an antenna 230 according to a typical wireless communication scheme (ISO14443), and transmits stored information through the antenna 230 in the wireless communication scheme at the time of receiving the information request signal. The wireless card processing unit 221 becomes inactivated or activated in an inactivated state by the OTP interlocking unit 222.

The wireless OTP processing unit 224 is activated or inactivated by the OTP interlocking unit 222, receives an OTP from the OTP control unit 213 of the OTP processing unit 210 in an activated state to store the OTP, and transmits the stored OTP to the mobile communication terminal 300 through the antenna when receiving, through the antenna 230, the information request signal according to the wireless communication scheme. The wireless OTP processing unit 224 stores the following basic information files.

Element File (EF)1=Information on the wireless OTP generator company (company code, company name, etc.)

EF2=Token serial number (TSN) of the wireless OTP generator

EF3=OTP issuer information (issuer code, issuer name, expiry date (issuing date, expiration date, etc.) etc.)

EF4=OTP generation seed information (Seed Key)

EF5=OTP authentication information={generation identifier |OTP length |OTP value (default value 0x0-0, ... )

Here, the generation identifier is defined according to whether the OTP is generated by a button (B(0x01)), by a wireless signal (R(0x02)), or by an OTP generation command (A(0x03)) of the mobile communication terminal 300.

The OTP interlocking unit 222 includes an interface unit 223 corresponding to the interface unit 214 of the OTP control unit 213 to perform data communication with the OTP control unit 213 of the OTP processing unit 210. The OTP interlocking unit 222 activates the wireless OTP processing unit 224 and deactivates the wireless card processing unit 221 upon receiving an OTP interlocking processing unit driving request signal from the OTP control unit 213. In addition, the OTP interlocking unit 222 may transmit the OTP to the mobile communication terminal 300 and then activate the wireless card processing unit 221 and deactivate the wireless OTP processing unit 224. However, the OTP interlocking unit 223 may also be configured to continuously activate the wireless card processing unit 221 and activate or deactivate only the wireless OTP processing unit 224. In this case, the mobile communication terminal 300 is required to perform reception by distinguishing information transmitted from the wireless card processing unit 221 from an OTP transmitted from the wireless OTP processing unit 224.

In addition, according to a third embodiment, the wireless OTP processing unit 224 of the wireless processing unit 220 may further include a sub-OTP generating unit 225, which is provided with the same seed information as that possessed by the OTP control unit 213 of the OTP processing unit 210, for generating an OTP based on the seed information. The sub-OTP generating unit 225 is connected to the input unit 215 to receive a button signal from the input unit 215. When the OTP is not received from the OTP control unit 213 despite the input of an OTP generation button signal, the sub-OTP generating unit 225 may be configured to generate an OTP, and when an OTP is not stored in the wireless OTP processing unit 224 despite reception of an OTP authentication request message through the antenna 230, the sub-OTP generating unit 225 may be configured to generate an OTP. The sub-OTP generating unit 225 may be configured to generate an OTP under both of the above-described conditions.

Figure 6:
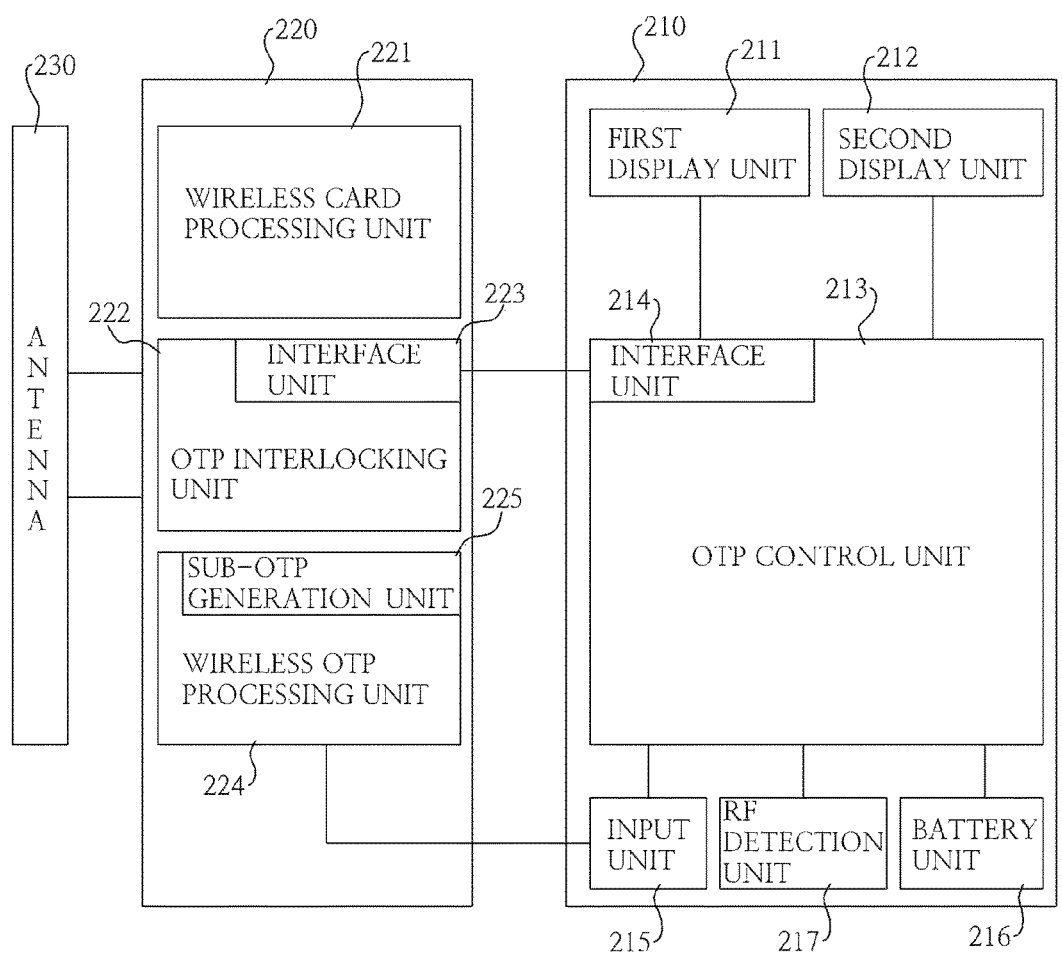
FIG. 6 illustrates the configuration of an OTP generator of an OTP wireless authentication system using a mobile communication terminal according to a second embodiment of the present invention.

FIG. 6 illustrates the configuration of an OTP generator of an OTP wireless authentication system using a mobile communication terminal according to a second embodiment of the present invention, and represents the case where an OTP is generated by an RF signal received from the mobile communication terminal 300. In describing FIG. 6, the same configurations as those of FIG. 5 will not be described.

The OTP processing unit 210 of the wireless OTP generating unit 200 in the second embodiment is connected to the antenna 230 to generate an OTP, display the OTP on the first display unit 211, and then transmit the OTP to the wireless processing unit 220 when an RF signal is detected through the antenna 230. At this point, the wireless OTP processing unit 224 of the wireless processing unit 220 receives the OTP through the OTP interlocking unit 223 to store the OTP.

Accordingly, the OTP processing unit 210 further includes an RF detection unit 217 for detecting an RF signal received through the antenna 230.

Figure 7:
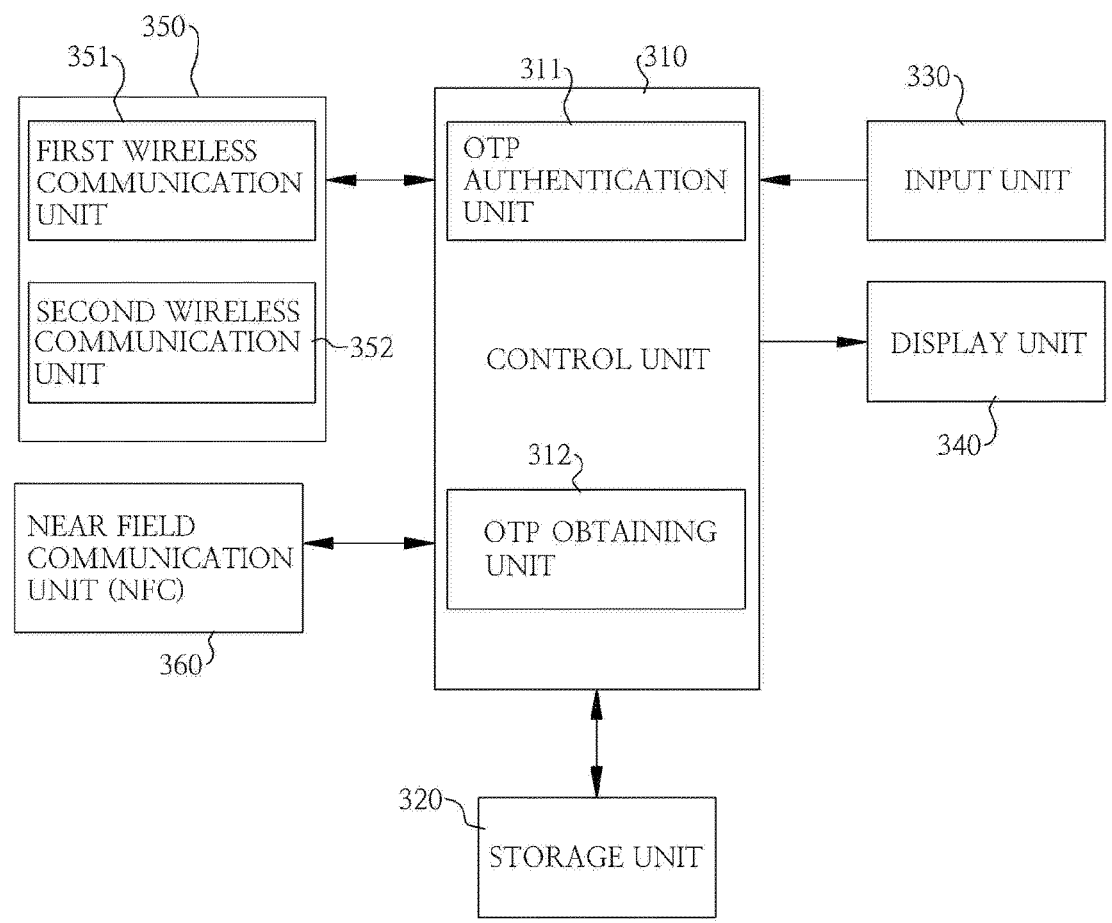
FIG. 7 illustrates the configuration of a mobile communication terminal of an OTP wireless authentication system according to an embodiment of the present invention.

FIG. 7 illustrates the configuration of a mobile communication terminal of an OTP wireless authentication system according to an embodiment of the present invention.

Referring to FIG. 7, the mobile communication terminal 300 according to the present invention includes a control unit 310, a storage unit 320, an input unit 330, a display unit 340, a communication unit 350, and an NFC unit 360.

The storage unit 320 includes a program region in which a control program for controlling an operation of performing OTP wireless authentication using NFC according to the present invention is stored, a cache in which data generated while the program is executed is temporarily stored, and a data region in which data generated while the control program is executed and data input by a user are stored. When the mobile communication terminal 300 is a smartphone, the control program may be an OTP wireless authentication application.

The input unit 330 may be configured with a key input unit, provided with keys through which a plurality of number keys and characters may be input and a volume and special functions may be selected, or may be configured with a key input unit provided with a small number of keys, through which a volume and special functions may be selected, and a touch pad, which is integrated with the display unit 340 and outputs coordinate data of the position touched on the screen of the display unit 340. In the latter case, the input unit 330 may be configured to provide a soft input means, which is a graphical user interface means, through the display unit 340, so as to allow numbers and characters to be input.

The display unit 340 displays the operational state of the mobile communication terminal 300 and various kinds of information through text, graphics, and images.

The communication unit 350 includes a first wireless communication unit 351, for connecting to a mobile communication network 420 of a communication network 400 to perform data communication, and a second wireless communication network 352, for connecting to a wired/wireless internet network 410 to perform data communication.

The NFC unit 360 performs data communication with an NFC communication apparatus in a short range according to an NFC communication protocol. The NFC communication apparatus may be an RFID tag a COB-type RF communication chip, etc., and the NFC communication apparatus according to the present invention is the wireless OTP generator 200. In other words, the NFC unit 360 reads card information from the wireless card processing unit 221 of the wireless OTP generator 200 under the control of the control unit 310, or reads an OTP from the wireless OTP processing unit 224 to output the OTP to the control unit 310.

The control unit 310 controls the overall operation of the mobile communication terminal 300 according to the present invention. In particular, the control unit 310 includes a touch authentication unit 311 for performing data communication with an arbitrary touch authentication server 500 through the communication unit 350 to receive an OTP registration confirmation message and an OTP authentication request message, and to accordingly provide an OTP to the touch authentication server 500, and an OTP obtaining unit 312 for obtaining an OTP from the wireless OTP generator 200 through the key input unit 330 and the NFC unit 360 when the touch authentication unit 311 receives one of the OTP registration confirmation message and the OTP authentication request message.

In the above description, the configuration and operation of the OTP wireless authentication system using a mobile communication terminal having an NFC function according to an embodiment of the present invention are described. Hereinafter, a method of registering a wireless OTP generator in the above-described system configuration and an OTP wireless authentication method using an NFC function of a mobile communication terminal will be described.

Figure 8:
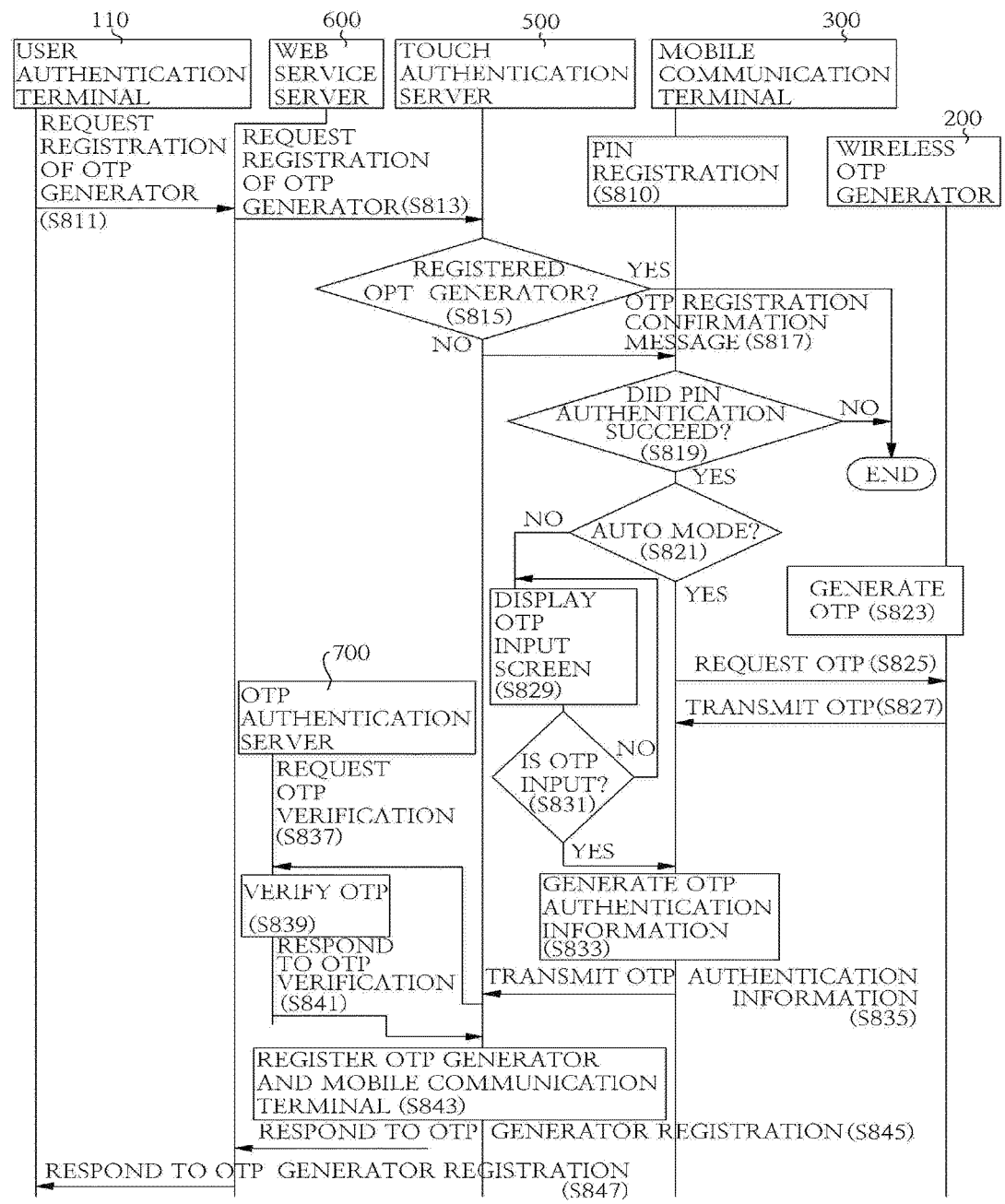
FIG. 8 is a procedure diagram of a method of registering an OTP generator in an OTP wireless authentication method using a mobile communication terminal having an NFC function according to an embodiment of the present invention.

FIG. 8 illustrates a method of registering an OTP generator in an OTP wireless authentication method using a mobile communication terminal having an NFC function according to an embodiment of the present invention.

Referring to FIG. 8, the user authentication terminal 110 receives user identification information, a token serial number (TSN), which is wireless OTP generator identification information, and mobile communication terminal identification information from a user through a generated OTP registration page provided by the web service server 600, and transmits an OTP generator registration request signal, which includes the user identification information, the TSN, and the mobile communication terminal identification information, to the web service server 600 (step S811). The user identification information may be an ID or a resident registration number, etc., the mobile communication terminal identification information may be a mobile phone number, an electronic serial number (ESN), or an international mobile equipment identity (IMEI), etc.

The web service server 600, which has received the OTP generator registration request signal, further adds its on service provide identification (SPID) to the OTP generator registration request signal and transmits the same to the touch identification server 500 (step S813).

Upon receiving the OTP generator registration request signal, the touch authentication server 500 detects the TSN, which is wireless OTP generator identification information included in the OTP generator registration request signal, and checks whether the TSN is a registered TSN in order to determine whether the wireless OTP generator is a registered OTP generator (step S815). However, the determination of whether the wireless OTP generator is the registered OTP generator may not be made.

When a wireless OTP generator having the TSN included in the OTP generator registration request signal is determined not to be the registered OTP generator, the touch authentication server 500 transmits an OTP registration confirmation message to the mobile communication terminal 300 (step S817).

The mobile communication terminal 300 receives a PIN from the user through the user authentication terminal 110 before requesting registration of the OTP generator and stores and registers the PIN (step S810).

After the PIN registration, when the OTP registration confirmation message is received from the touch authentication server 500, the mobile communication terminal 300 requests input of the PIN, and when the PIN is input as requested, compares the input PIN with the registered PIN to perform PIN authentication (step S819). The PIN may be stored in the mobile communication terminal 300 or in the OTP interlocking unit 222 of the wireless OTP generator 200. In the latter case, configuration may be made such that the mobile communication terminal 300 drives the NFC unit 360 to read the PIN from the wireless OTP generator 200 and performs PIN authentication, or such that the mobile communication terminal 300 drives the NFC unit 360 to provide the input PIN to the wireless OTP generator 200, and the wireless OTP generator 200 performs PIN authentication and returns the result to the mobile communication terminal 300.

When PIN authentication fails, the procedure is terminated, and when PIN authentication succeeds, whether an OTP obtaining mode is set to an auto mode or an input mode is determined (step S821). The auto mode and the input mode may be preset in advance, or may be configured to be selected after the PIN authentication.

In case of the auto mode, the mobile communication terminal 300 transmits an OTP request signal to the wireless OTP generator 200 through the NFC unit 360 (step S825).

The wireless OTP generator 200 then transmits, to the mobile communication terminal 300, an OTP that is pre-generated and stored in the wireless OTP processing unit 224 at the time of receiving the OTP request signal, or that is generated by the OTP request signal and stored in the wireless OTP processing unit 224 (step S827). In order for the OTP to be pre-stored in the wireless OTP processing unit 224, the user must press an OTP generation button of the input unit 215 of the wireless OTP generator 200 to generate the OTP before the PIN authentication, and the wireless OTP processing unit 224 must be activated by the generation of the OTP. However, the OTP generated by the OTP generation button or the RF signal may be stored in the OTP interlocking unit 222, and when the OTP request signal is received, the OTP interlocking unit 222 may transmit the stored OTP to the mobile communication terminal 300 through the antenna 230.

On the other hand, when the OTP obtaining mode is set to the input mode, not the auto mode, the mobile communication terminal 300 may display an OTP input screen through the display unit 340 to request input of the OTP (step S829).

After the request for the OTP input, the mobile communication terminal 300 monitors whether the OTP is input (step S831).

When the OTP is received from the wireless OTP generator 200 in the auto mode or the OTP is input through the input unit 330 in a manual mode, the mobile communication terminal 300 generates OTP authentication information (step S833) and then transmits the OTP authentication information to the touch authentication server 500 (step S835).

The touch authentication server 500 then transmits an OTP verification request signal, which includes the received OTP and the TSN (or seed information), to the OTP authentication server 700 (step S837).

The OTP authentication server 700, having received the OTP verification request signal, performs authentication on the received OTP with the TSN (or seed information) and transmits an OTP verification response signal including the authentication result to the touch authentication server 500 (step S841).

When the OTP authentication response signal indicates success of the verification, the touch authentication server 500, having received the OTP authentication response signal, stores the TSN and the mobile communication terminal identification information to thus register the OTP generator and the mobile communication terminal 300 (step 843), and provides a registration success OTP generator registration response signal to the web service server 600 (step S845). When OTP verification fails, the touch authentication server 500 provides a registration failure OTP generator registration response signal to the web service server 600.

When the OTP generator registration response signal is the registration success OTP generator registration response signal, the web service server 600, having received the OTP generator registration response signal, provides information about whether the OTP generator is registered to the user authentication terminal 110 (step S847).

Figure 9:
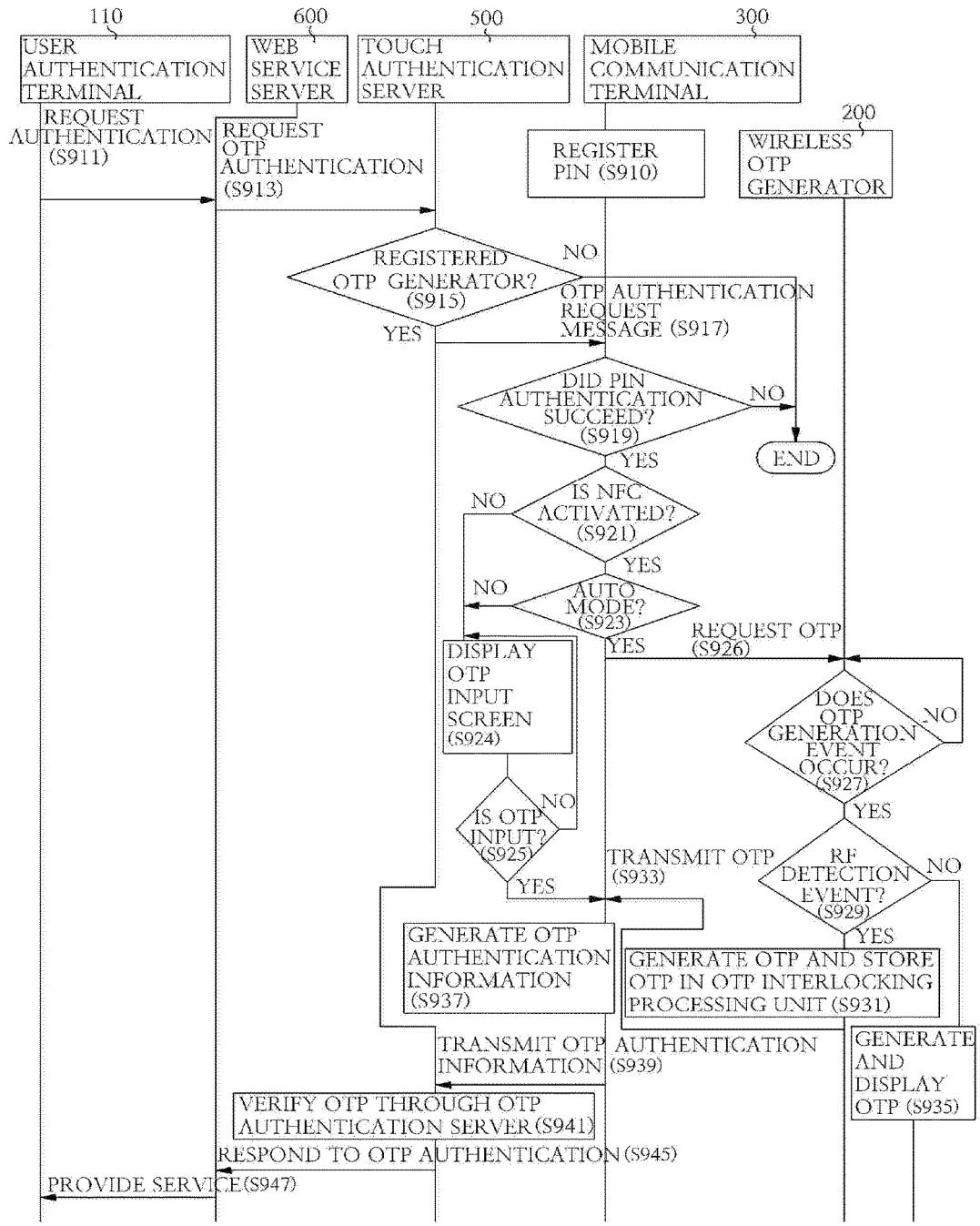
FIG. 9 is a procedure diagram of an OTP wireless authentication method using a mobile communication terminal having an NFC function according to a third embodiment of the present invention.

FIG. 9 is a procedure diagram illustrating a wireless authentication method for an OTP using a mobile communication terminal having an NFC function according to third embodiments of the present invention.

Referring to FIG. 9, the user authentication terminal 110 is connected to the web service server 600 and then an OTP authentication event occurs, and the user transmits an OTP authentication request signal, which includes at least one of the user identification information, wireless OTP generator identification information, and mobile communication terminal identification information, to the web service server 500 to request the OTP authentication (step S911).

When the OTP authentication request occurs in the user authentication terminal 110, the web service server 600 transmits an OTP authentication request signal, which further includes own service provider identification information (SPID), to the touch authentication server 600 (step S913).

The touch authentication server 500 determines whether the OTP generator is an OTP generator registered with TSN, which is the wireless OTP generator identification information included in the OTP authentication request signal, (step S915), and in the case of a registered OTP generator, transmits an OTP authentication request message to the mobile communication terminal 300 corresponding to the included mobile communication terminal identification information (step S917).

The mobile communication terminal 300, which has received the OTP authentication request message, requests input of a PIN, and when the PIN is input, compares it with the pre-registered PIN as shown in FIG. 8 to perform PIN authentication (step S919).

When PIN authentication fails, the mobile communication terminal 300 terminates the procedure, and when PIN authentication succeeds, the mobile communication terminal 300 checks whether the NFC unit 360 is activated (step S921).

As the result of the checking, when the NFC unit 360 is not activated, the mobile communication terminal 300 considers the OTP obtaining mode to be an input mode, and when the NFC unit 360 is activated, the mobile communication terminal 300 determines whether the OTP obtaining mode is set to the auto mode or the input mode (step S923).

When the NFC unit 360 is activated and the OTP obtaining mode is set to the auto mode, the mobile communication terminal 300 transmits an OTP request signal to the wireless OTP generator 200 through the NFC unit 360 (step S926).

Upon commencement of operation, i.e. when powered on, the wireless OTP generator 200 checks whether an OTP generation event occurs (step S927). The OTP generation event occurs when an OTP generation button of the input unit 215 is pressed to input a button signal, an OTP request signal is received from the mobile communication terminal 300, or the OTP processing unit 210 is determined to be faulty by the wireless OTP processing unit 224.

When the OTP generation event occurs, the wireless OTP generator 200 determines whether the OTP generation event is an event generated by an RF signal transmitted by the mobile communication terminal 300 or an event occurring in response to pressing of the OTP generation button (step S929).

When the OTP generation event is an event that occurs as a result of detection of the RF signal, the wireless OTP generator 200 generates an OTP and stores the OTP in the wireless card processing unit 221 or the wireless OTP processing unit 224 (step S931), and then transmits the generated OTP to the mobile communication terminal 300 (step S933).

The mobile communication terminal 300, having received the OTP, generates OTP authentication information including the mobile communication terminal identification information and the TSN, and then transmits the OTP authentication information to the touch authentication server 500 (step S939).

The touch authentication server 500, having received the OTP authentication information, performs OTP verification through the OTP authentication server 700 in a manner identical to steps S837 to S841 in FIG. 8 (step S941), and transmits an OTP authentication response signal including information about whether verification succeeded to the web service server 600 (step S945).

In addition, the web service server 600 may provide or block a service depending on the verification result for the OTP authentication response signal (step S947).

Figure 10:
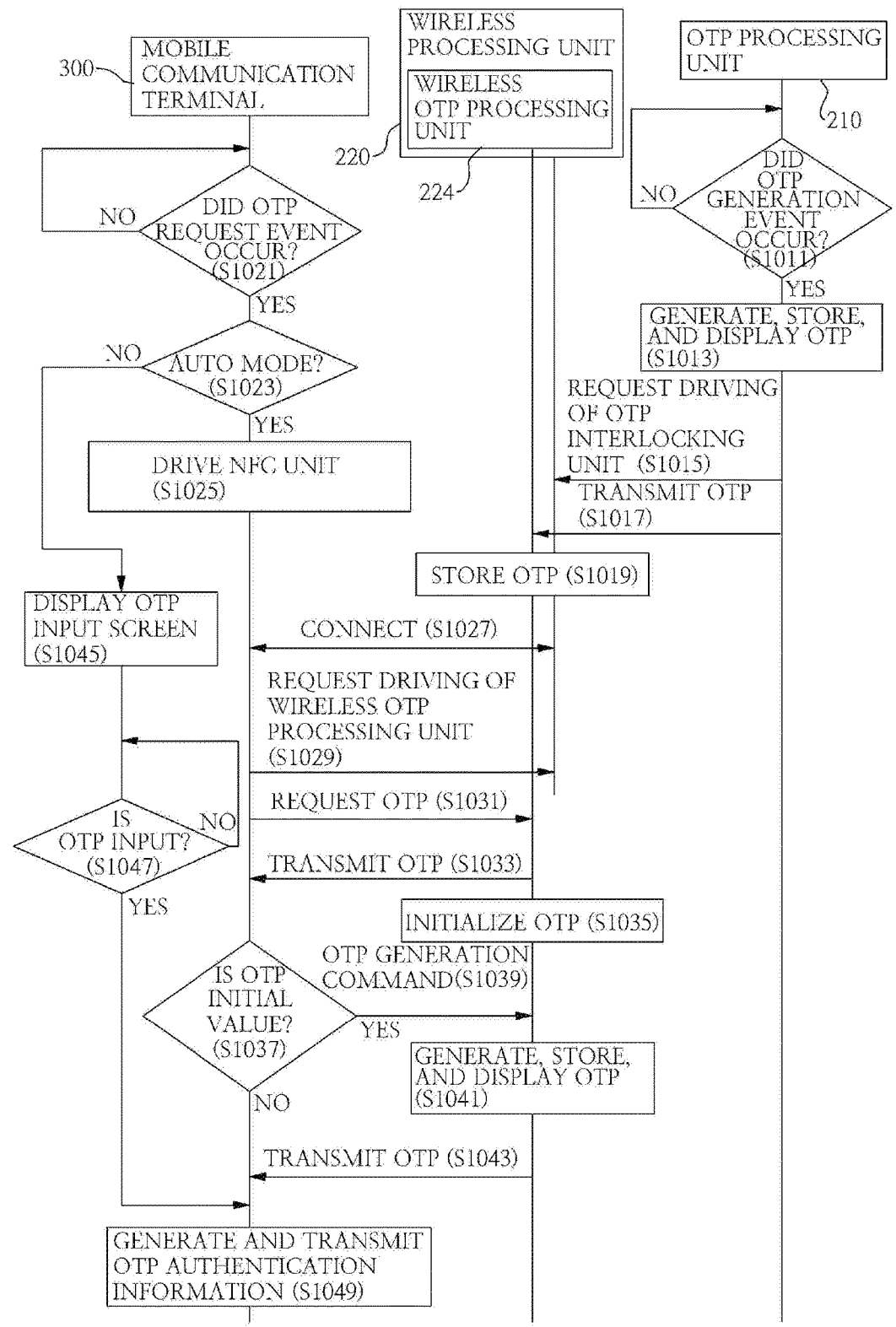
FIG. 10 is a procedure diagram of an OTP wireless authentication method using a mobile communication terminal having an NFC function according to a fourth embodiment of the present invention.

FIG. 10 is a procedure diagram of an OTP wireless authentication method using a mobile communication terminal having an NFC function according to a fourth embodiment of the present invention, and represents the case where the OTP is generated by the wireless processing unit at the time of a fault of the OTP processing unit. Hereinafter, a description will be provided with reference to FIG. 10, but identical processes to those of FIG. 9 will be omitted or briefly described.

Referring to FIG. 10, the mobile communication terminal 300 checks whether an OTP request event occurs (step S1021). The OTP request event may occur in response to reception of an OTP authentication request message from the touch authentication server 500, as shown in FIG. 9.

When the OTP request event occurs, PIN authentication is performed, and then the OTP obtaining mode is an auto mode or an input mode (step S1023).

In the case of the input mode, the mobile communication terminal 300 displays an OTP input screen on the display unit 340 (step S1045) and then checks whether an OTP is input (step S1047).

When the OTP is input, the mobile communication terminal 300 generates the OTP authentication information and transmits the OTP authentication information to the touch authentication server 500 (step S1049).

In contrast, when the OTP obtaining mode is the auto mode, after driving the NFC unit 360 (step S1025), the mobile communication terminal 300 wirelessly connects to the wireless processing unit 220 of the wireless OTP generator 200 (step S1027) and transmits an OTP interlocking unit driving request signal to the wireless processing unit 220. Then, the OTP interlocking unit 222 of the wireless processing unit 220 deactivates the wireless card processing unit 221 and activates the wireless OTP processing unit 224.

After requesting driving of the OTP interlocking unit 222, the mobile communication terminal 300 transmits the OTP request signal to the wireless OTP generator 200 (step S1031).

The wireless OTP processing unit 224 of the wireless processing unit 220 then transmits an OTP, generated by the OTP processing unit 210 of the wireless OTP generator 200 in step S1013, to the mobile communication terminal 300 (step S1033). The wireless OTP processing unit 224 of the wireless processing unit 220 initializes the OTP after the transmission of the OTP (step S1035).

The mobile communication terminal 300, having received the OTP, determines whether the received OTP is an initial value (e.g. 0) (step S1037). As the result of the determination, when the received OTP is not the initial value, the mobile communication terminal 300 generates OTP authentication information including the received OTP and transmits the OTP authentication information to the touch authentication server 500 (step S1049).

On the other hand, when the received OTP is the initial value, the mobile communication terminal 300 considers the OTP processing unit 210 of the wireless OTP generator 200 to have failed, and transmits an OTP generation command to the wireless OTP processing unit 224 of the wireless processing unit 220 of the wireless OTP generator 200 (step S1039).

When receiving the OTP generation command, the wireless OTP processing unit 224 generates an OTP through the sub-OTP generating unit 225 and stores the OTP (step S1041). The wireless OTP processing unit 224 is connected to the first display unit 211 of the OTP processing unit 210 and outputs the OTP to the first display unit 211. At this point, as long as it has not failed, the first display 211 may display the OTP.

When the OTP is generated and stored, the wireless OTP processing unit 224 transmits the generated OTP to the mobile communication terminal 300 (step S1043). The mobile communication terminal then generates OTP authentication information including the received OTP to transmit the OTP authentication information to the touch authentication server 500 (step S1049).

Figure 11:
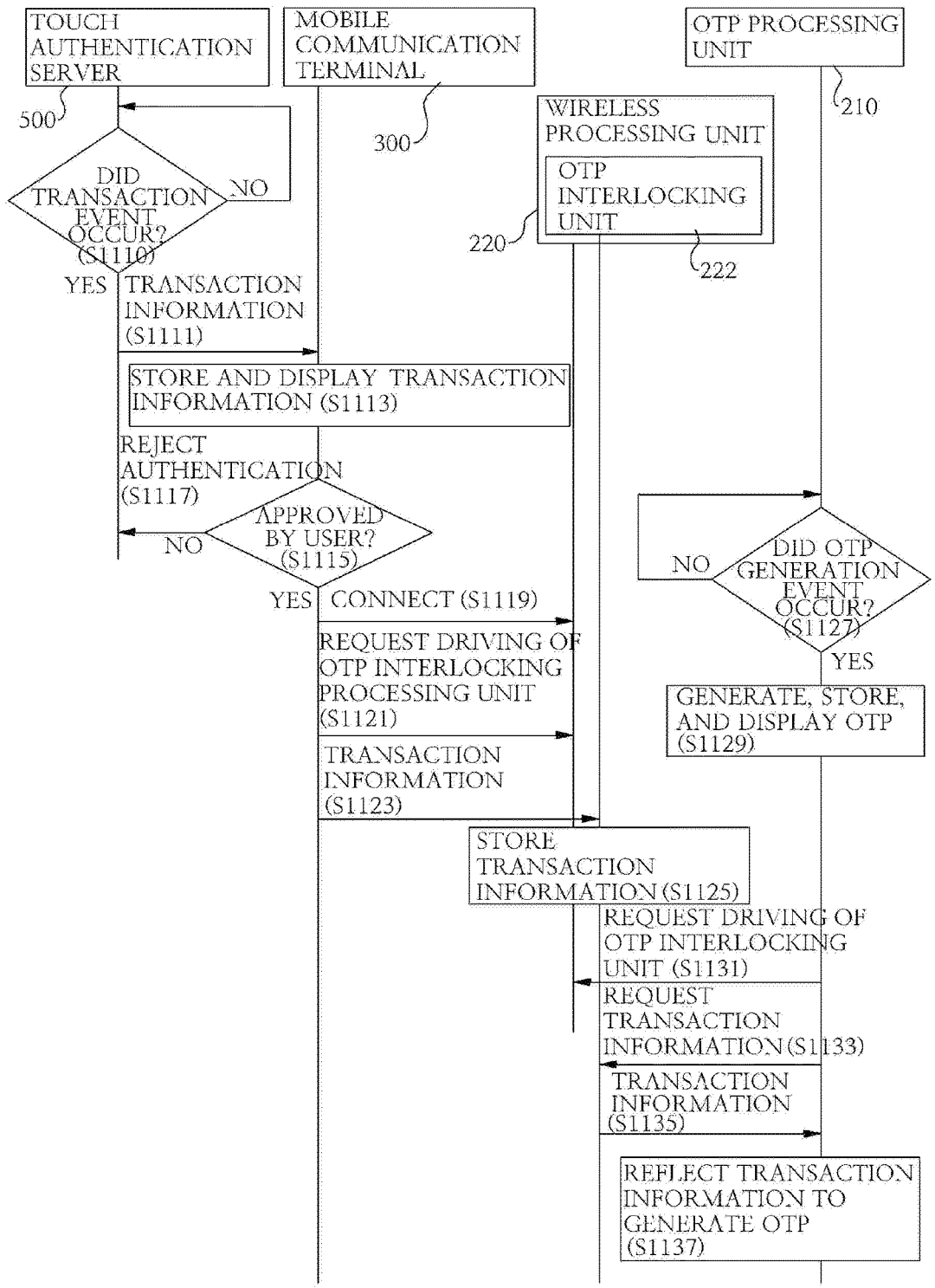
FIG. 11 illustrates a procedure diagram of a method for providing transaction information in an OTP wireless authentication method using a mobile communication terminal according to a fifth embodiment of the present invention.

FIG. 11 is a procedure diagram illustrating a method for providing transaction information in an OTP wireless authentication method using a mobile communication terminal according to a fifth embodiment of the present invention.

The touch authentication server 500 checks whether a transaction event occurs (step 1110). The transaction event occurs when transaction information is received from the web service server 600. Here, "transaction information" means financial transaction information generated in the web service server 600, and may be account information and information about money to be transferred, etc. Hereinafter, the case where the transaction information is account information and information about money to be transferred will be described by way of example.

When the transaction event occurs, the touch authentication server 500 transmits transaction information to the mobile communication terminal 300 (step S1111).

The mobile communication terminal 300, having received the transaction information, stores the transaction information and then displays the transaction information on the display unit 340 (step S1113).

After displaying the transaction information, the mobile communication terminal 300 prompts for approval of the displayed transaction information and then checks whether the user approves the transaction information (step S1115).

When the user rejects the transaction information, the mobile communication terminal 300 transmits an authentication rejection signal to the touch authentication server 500 (step S1117).

When the authentication rejection signal is received, the touch authentication server 500 will transmit the authentication rejection signal to the web service server 600 (not illustrated). In addition, the web service server 600 will terminate the web service that generates the transaction information (not illustrated).

On the other hand, when the user approves the displayed transaction information, the mobile communication terminal 300 connects to the wireless processing unit 220 of the wireless OTP generator 200 (step S1119) and then transmits a driving request signal of the wireless OTP processing unit 224 (step S1121). At this point, the OTP interlocking unit 222 of the wireless processing unit 220 will activate the wireless OTP processing unit 224.

After transmitting the driving request signal of the wireless OTP processing unit 224, the mobile communication terminal 300 transmits transaction information to the wireless OTP processing unit 224 (step S1123).

The wireless OTP processing unit 224, having received the transaction information, stores the transaction information (step S1125).

After storing the transaction information, the OTP processing unit 210 checks whether an OTP generation event occurs (step S1127).

When the OTP generation event occurs, the OTP processing unit 210 transmits the driving request signal of the wireless OTP processing unit 224 to the OTP interlocking unit 222 of the wireless processing unit 220 (step S1131), and then transmits a transaction information request signal (step S1133).

For the transaction information request, when the transaction information is received from the wireless OTP processing unit 224 of the wireless processing unit 220 (step S1135), the OTP processing unit 210 reflects the transaction information to generate the OTP. In other words, the wireless OTP generator 200 reflects the transaction information to generate the OTP.

Meanwhile, those skilled in the art will appreciate that the present invention is not limited to the above-described typical embodiments, and that various improvements, modifications, additions and substitutions are possible, without departing from the scope and spirit of the invention as disclosed in the accompanying claims. It should be understood that as long as the implementation of improvements, modifications, additions and substitutions fall within the scope of the accompanying claims, the spirit thereof belongs to the scope of the present invention.

The invention claimed is:

1. A one-time password (OTP) authentication system comprising an OTP authentication server, the OTP authentication system comprising:

a web service server configured for providing one of an OTP generator registration means and an OTP authentication means depending on whether an OTP generator is registered when a user requests a web service requiring OTP authentication through a user authentication terminal, transmitting one of an OTP generator registration request signal, which comprises user identification information and identification information for a mobile communication terminal of the user, and an OTP authentication request signal, and providing the web service depending on an OTP verification result received in response thereto;

a wireless OTP generator configured for generating and displaying an OTP when an OTP generation event occurs and wirelessly transmitting the OTP when an OTP request signal is received;

a mobile communication terminal configured for obtaining the OTP generated by the wireless OTP generator when an OTP request message is received and transmitting OTP authentication information comprising the OTP and identification information of the mobile communication terminal; and a touch authentication server configured for obtaining the OTP authentication information and registering the wireless OTP generator and the mobile communication terminal through the mobile communication terminal when the OTP generator registration request signal is received from the web service server, obtaining the OTP authentication information through a mobile communication terminal corresponding to the user identification information when an OTP authentication request signal for registered user identification information is received, verifying an OTP of the obtained OTP authentication information through the OTP authentication server, and providing an OTP verification result to the web service server, wherein the wireless OTP generator comprises: an OTP processing unit configured for generating, displaying, and outputting the OTP; and a wireless processing unit configured for receiving and storing the OTP and wirelessly transmitting the stored OTP to the mobile communication terminal through an antenna when an OTP request signal is received from the mobile communication terminal through the antenna, and wherein the wireless processing unit comprises: a wireless card processing unit configured for performing operations according to a wireless card function;

a wireless OTP processing unit configured for receiving and storing, in an activated state, an OTP output from the wireless processing unit, and wirelessly transmitting the stored OTP to the mobile communication terminal through the antenna, upon receiving the OTP request signal through the antenna; and an OTP interlocking unit configured for activating the wireless card processing unit to perform the wireless card function by default, and receiving a wireless OTP processing unit driving request signal through communication with the OTP processing unit to activate the wireless OTP processing unit, wherein the OTP processing unit comprises:

a first display unit, displaying the OTP;

an input unit, comprising at least one button, which comprises an OTP generation button, and outputting a button signal indicating a pressed button;

a power supply unit, supplying power to the OTP processing unit; and an OTP control unit, receiving the power to operate the OTP processing unit, detecting the OTP generation event due to an input of the OTP button signal to generate the OTP, displaying the OTP on the first display unit, and outputting the OTP, and wherein the web service server transmits transaction information to the touch authentication server when a transaction event is generated by an arbitrary web service, and determines whether to provide a corresponding web service according to whether the transaction information is approved, the touch authentication server transmits, to the mobile communication terminal, the transaction information upon receiving the transaction information by the transaction event generated from the web service server, and receives information about whether to approve the transaction information from the mobile communication terminal and provides the information about whether to approve the transaction to the web service server, the mobile communication terminal displays the transaction information to a user upon receiving the transaction information, requests driving of the wireless OTP processing unit of the wireless OTP generator upon receiving approval of the user, and transmits the transaction information, the wireless OTP processing unit of the wireless OTP generator stores the transaction information upon receiving the transaction information, and the OTP processing unit loads the transaction information when the transaction information is stored in the wireless OTP processing unit at a time that the OTP generation event occurs, and reflects the transaction information to generate the OTP.

2. The OTP authentication system of claim 1, wherein the OTP processing unit comprises:

the first display unit, displaying the OTP;

an RF detection unit, detecting an RF signal received through the antenna;

a power supply unit, supplying power to the OTP processing unit; and an OTP control unit, receiving the power to operate the OTP processing unit, sensing the OTP generation event by detecting the RF signal through the RF detection unit to generate the OTP, displaying the OTP on the first display unit, and outputting the OTP.

3. The OTP authentication system of claim 1, further comprising: a second display unit emitting light under a control of the OTP control unit at a time of an OTP generation operation by the OTP control unit.

4. The OTP authentication system of claim 1, wherein the wireless OTP processing unit further comprises a sub-OTP generation unit, generating an OTP and storing the OTP in the activated state when an OTP generation command is received from the mobile communication terminal, wherein the mobile communication terminal obtains an OTP by transmitting the OTP generation command to the wireless OTP processing unit of the wireless OTP generator when the OTP obtained from the wireless OTP generator is an initial value.

5. The OTP authentication system of claim 1, wherein the OTP in which the transaction information is reflected is generated by any one selected from the following Equations 1 to 3:

Time-based OTP Algorithm (TOTP,RFC6238) scheme Transaction_OTP=HMAC (SeedKey, Time+transaction message)    [Equation 1]

HOTP (HMAC-Based OTP Algorithm (RFC4226)) scheme Transaction_OTP=HMAC (SeedKey, [Authentication Counter or time or challenge],+ transaction message)    [Equation 2]

OCRA (OATH Challenge/Response Algorithms Specification (RFC6287) Scheme

Transaction_OTP=HMAC (SeedKey,client Random+ authentication Counter+server Random+Time+ transaction message).    [Equation 3]

6. The OTP authentication system of claim 1, wherein the transaction information is one of an account number and a card number.

7. A one-time password (OTP authentication method of an OTP authentication system comprising an OTP authentication server, the OTP authentication method comprising steps for:
receiving, by a touch authentication server, user identification information or mobile communication terminal identification information and registering a wireless OTP generator of a user in the touch authentication server when the user requests a web service requiring OTP authentication through a web service server for providing the web service;
requesting, by the touch authentication server, an OTP from a mobile communication terminal corresponding to mobile communication terminal identification information corresponding to user identification information of an arbitrary user, when the web service request is made to the web service server by the arbitrary user, after the wireless OTP registration;
generating, by a wireless OTP generator, an OTP, when an OTP generation event occurs;
obtaining, by the mobile communication terminal, the OTP generated in the step for generating and providing the OTP to the touch authentication server, when an OTP authentication request is received from the touch authentication server;
checking, by the mobile communication terminal, whether the obtained OTP is an initial value, and if the obtained OTP is the initial value, transmitting an OTP generation command to the wireless OTP generator, and in response thereto, receiving a new OTP generated by the wireless OTP generator, if the obtained OTP is not the initial value, keeping the obtained OTP; and
verifying, by the touch authentication server, an OTP received from the mobile communication terminal through the OTP authentication server and providing a verification result to the web service server,
wherein the step for generating comprises:
an OTP generation event monitoring step for checking, by the OTP processing unit, whether the OTP generation event occurs;
an OTP generation step for generating, by the OTP processing unit, the OTP when the OTP generation event occurs;
an OTP display step for displaying, by the OTP processing unit, the generated OTP on a first display unit; and
a storage step for outputting, by the OTP processing unit, the displayed OTP to a wireless processing unit to store the OTP in the wireless processing unit, and
wherein the OTP generation event occurs when an OTP generation button of an input unit of a wireless OTP generator is pressed.

8. The OTP authentication method of claim 7, wherein the OTP generation event occurs by detecting, by the OTP processing unit, an OTP request signal received from the mobile communication terminal through an RF detection unit connected to an antenna.

9. The OTP authentication method of claim 7, wherein the step for generating further comprises an operation informing step for flashing a second display unit formed of a light-emitting diode and indicating that the OTP processing unit is in operation at a time of generating and displaying the OTP.

10. The OTP authentication method of claim 7, wherein the step for obtaining comprises:

an OTP reception monitoring step for monitoring whether the OTP authentication request signal is received from the touch authentication server;
an OTP input monitoring step for monitoring whether the OTP is input from the input unit when the OTP authentication request signal is received; and
an OTP providing step for providing the OTP to the touch authentication server when the OTP is input through the input unit.

11. The OTP authentication method of claim 7, wherein the step for obtaining comprises:
an OTP reception monitoring step for monitoring whether the OTP authentication request signal is received from the touch authentication server;
an OTP obtaining step for driving a near-field communication (NFC) unit to wirelessly read an OTP stored in the wireless processing unit of the wireless OTP generator when the OTP authentication request signal is received; and
an OTP providing step for providing the OTP to the touch authentication server when the OTP is obtained through the NFC unit.

12. The OTP authentication method of claim 10, wherein the step for obtaining further comprises:
a PIN authentication step for requesting input of a PIN from the user and receiving the PIN, and comparing a preset PIN with the input PIN to perform PIN authentication when the OTP authentication request signal is received in the OTP reception monitoring step.

13. The OTP authentication method of claim 7, wherein the step for checking comprises:
an OTP abnormality determination step for checking, by the mobile communication terminal, whether the obtained OTP is an initial value;
a wireless OTP processing unit driving request step for determining that the OTP is abnormal when the OTP is the initial value and transmitting a wireless OTP processing unit driving command;
a wireless OTP processing unit driving step for driving, by an OTP interlocking unit, the wireless OTP processing unit by the wireless OTP processing unit driving command;
an OTP generation request step for transmitting, by the mobile communication terminal, the OTP generation command;
an OTP providing step for driving, by the wireless OTP processing unit, a sub-OTP generation unit to generate the OTP and transmitting the OTP to the mobile communication terminal; and
an OTP obtaining step for obtaining, by the mobile communication terminal, the OTP from the wireless OTP processing unit.

14. A one-time password (OTP) authentication method of an OTP authentication system comprising an OTP authentication server, the OTP authentication method comprising steps for:
receiving, by a touch authentication server, user identification information or mobile communication terminal identification information and registering a wireless OTP generator of a user in the touch authentication server when the user requests a web service requiring OTP authentication through a web service server for providing the web service;
requesting, by the touch authentication server, an OTP from a mobile communication terminal corresponding to mobile communication terminal identification information corresponding to user identification information of an arbitrary user, when a web service request is made to the web service server by the arbitrary user;

generating, by a wireless OTP generator, an OTP when an OTP generation event occurs;

obtaining, by the mobile communication terminal, the OTP generated in the step for generating and providing the OTP to the touch authentication server when the OTP authentication request is received from the touch authentication server; and performing, by the touch authentication server, OTP verification on an OTP received from the mobile communication terminal through the OTP authentication server and providing a verification result to the web service server, and further comprising steps for:

transmitting, by the web service server, transaction information to the touch authentication server when the transaction information is generated in the step for requesting;

transmitting, by the touch authentication server, the transaction information to the mobile communication terminal, upon receiving the transaction information in response to occurrence of a transaction event from the web service server;

displaying, by the mobile communication terminal, the transaction information to a user upon receiving the transaction information, and prompting the user to approve the transaction information;

transmitting, by the mobile communication terminal, the transaction information after a request for driving a wireless OTP processing unit of a wireless OTP generator, when approval for the displayed transaction information is input; and storing, by the wireless OTP generator, the transaction information when the transaction information is received from the mobile communication terminal, wherein the transaction information is reflected to generate the OTP when the stored transaction information exists at a time of occurrence of the OTP generation event in the step for generating.

15. The OTP authentication method of claim 14, wherein the OTP in which the transaction information is reflected is generated by any one selected from the following Equations 1 to 3;

$$\text{Time-based OTP Algorithm (TOTP,RFC6238)} \\ \text{scheme Transaction\_OTP=HMAC (SeedKey,} \\ \text{Time+transaction message)} \quad \text{[Equation 1]}$$

$$\text{HOTP (HMAC-Based OTP Algorithm (RFC4226))} \\ \text{scheme Transaction\_OTP=HMAC (SeedKey,} \\ \text{[Authentication Counter or time or challenge],+} \\ \text{transaction message)} \quad \text{[Equation 2]}$$

$$\text{OCRA (OATH Challenge/Response Algorithms} \\ \text{Specification (RFC6287) Scheme}$$

$$\text{Transaction\_OTP=HMAC (SeedKey,client Random+} \\ \text{authentication Counter+server Random+Time+} \\ \text{transaction message).} \quad \text{[Equation 3]}$$

16. The OTP authentication method of claim 11, wherein the step for obtaining further comprises:

a PIN authentication step for requesting input of a PIN from the user and receiving the PIN, and comparing a preset PIN with the input PIN to perform PIN authentication when the OTP authentication request signal is received in the OTP reception monitoring step.

\* \* \* \* \*